United States Patent Office 3,485,676
Patented Dec. 23, 1969

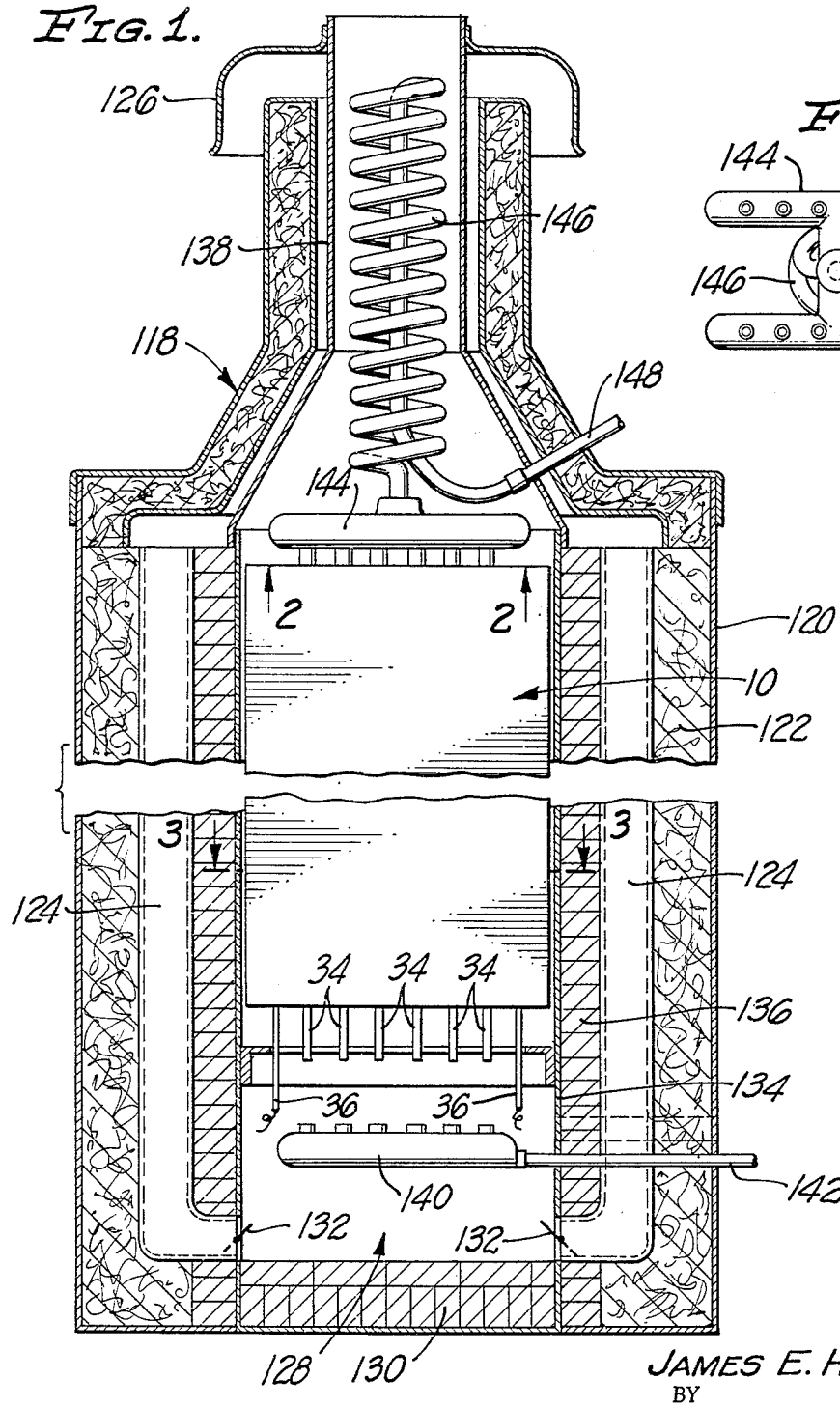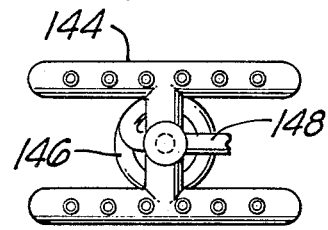

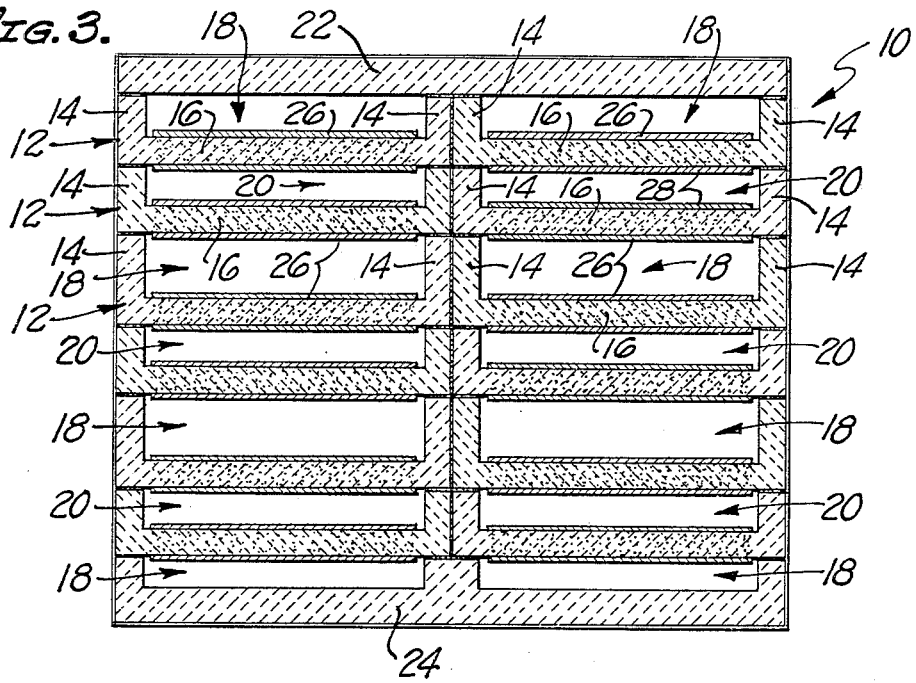
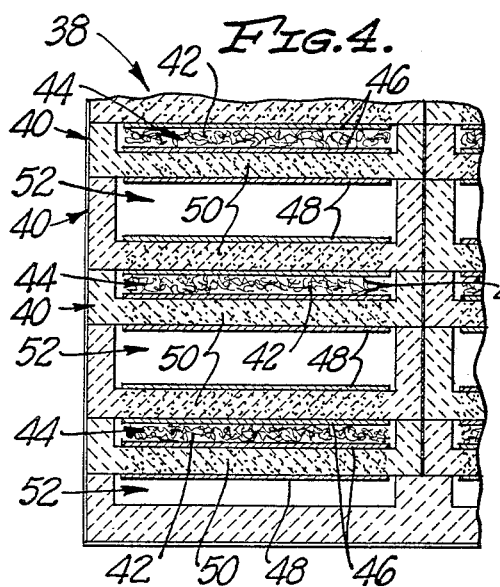
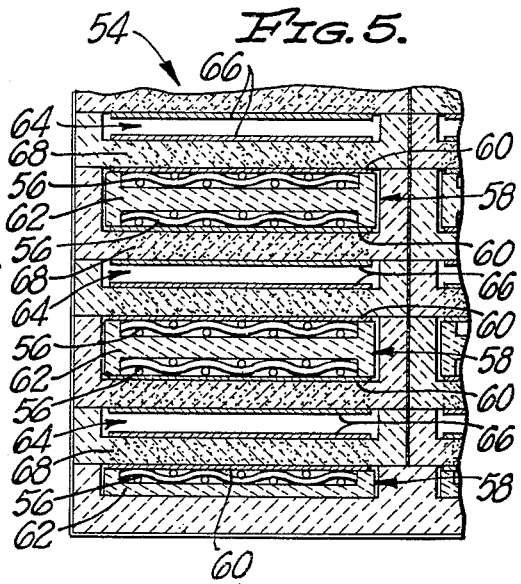

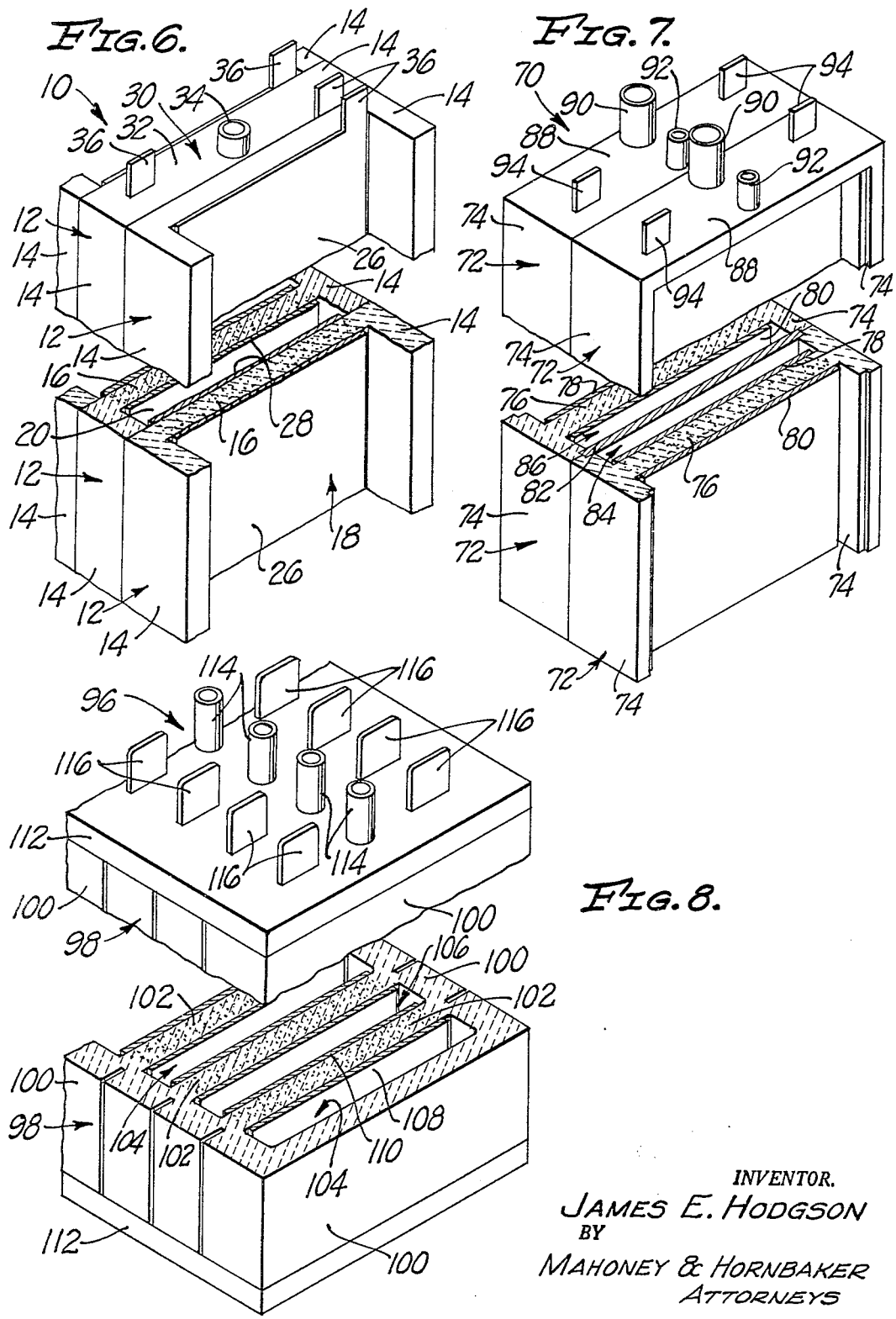

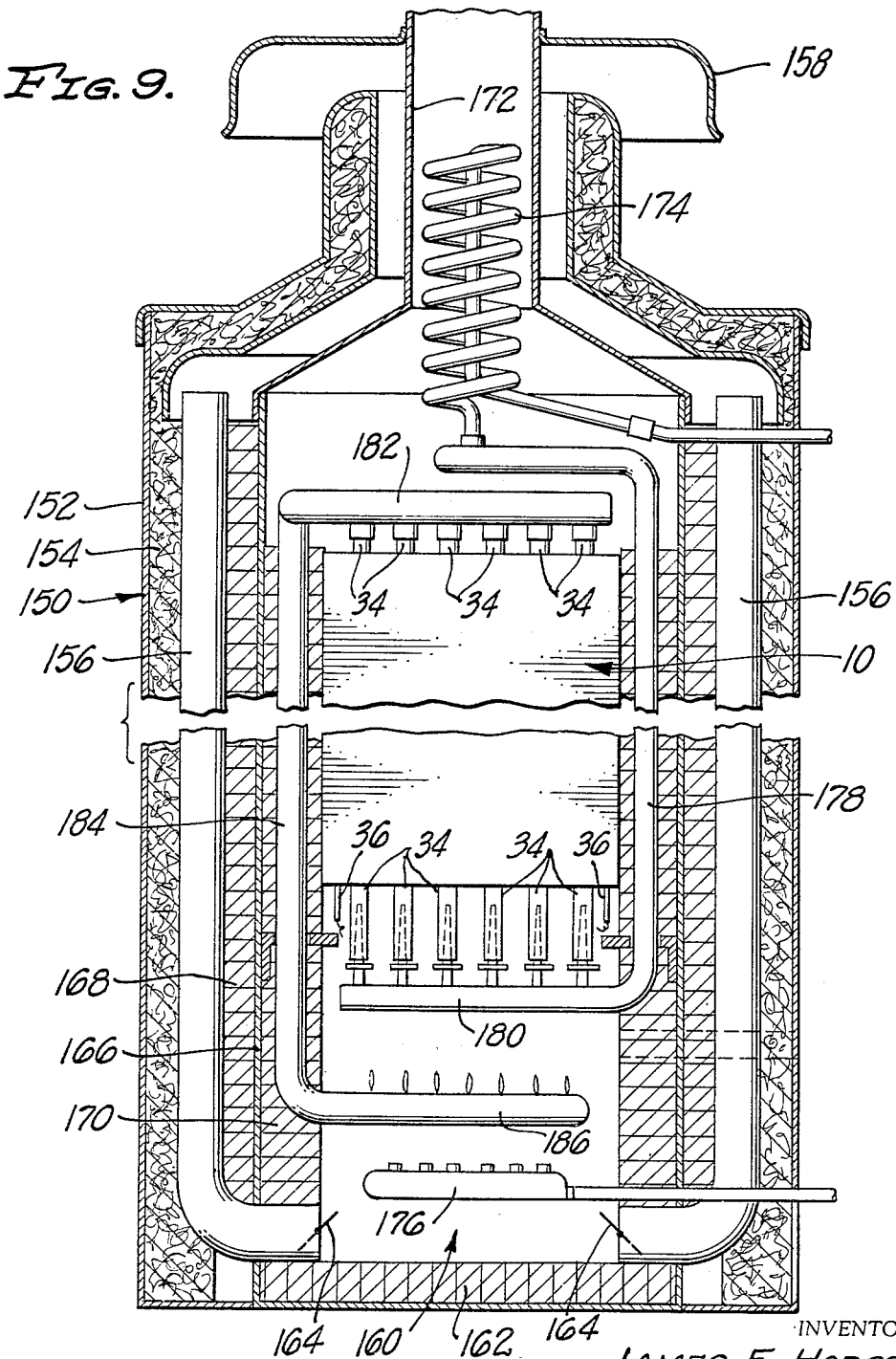

3,485,676
FUEL CELL INCLUDING FIRE-GLAZED CERAMIC WALLS AND CERAMIC ELECTROLYTE IMPREGNATED PARTITION
James E. Hodgson, Papeari, Tahiti, assignor of one-half to Adolf Schoepe, Fullerton, Calif.
Filed Dec. 27, 1966, Ser. No. 604,966
Int. Cl. H01m 27/04
U.S. Cl. 136—86                                 8 Claims

ABSTRACT OF THE DISCLOSURE

A plurality of adjacent fuel cells are formed each having a porous, electrolyte impregnated, ceramic partition which is rigid and shape self-sustaining prior to and after said electrolyte impregnation with said electrolyte impregnating said porosity thereof. Ceramic walls, sealed preferably by fire glazed coatings, are connected to each of the porous ceramic partition so as to form a fuel gas channel at one side and an oxidizing gas channel at the other side of each of the porous ceramic partitions. Various of the ceramic walls may be formed integral with ceramic partitions within the fuel cell assembly, the ceramic walls being sealed and the ceramic partitions remaining porous.

---

This invention relates to a fuel cell structure and an assembly incorporating said fuel cell srtucture. More particularly, this invention relates to a fuel cell structure formed principally as a ceramic unit wherein the only metal which need be incorporated therein is that necessary for the electrodes and the electrical leads therefrom. The fuel cell assemblies of the present invention incorporate the foregoing unique ceramic fuel cell structure providing economical assemblies which operate with a maximum of efficiency.

The basic theory of fuel cells for the direct production of electrical energy from the chemical energy of combustible fuel gases is well known to those skilled in the art. Such fuel cells may include a liquid electrolyte in contact with spaced, porous gas-diffusing eectrodes, with an oxidizing gas in contact with one eletcrode and a fuel gas in contact with the other electrode. The absorption of the gases by the respective electrodes and the ion exchange resulting through the electrolyte results in opposite electrical charges being created on the electrodes so that electrical energy capable of use is created.

All prior fuel cell structures to my knowledge have made use of large amounts of metal parts in addition to the electrodes for forming the necessary containment of the liquid electrolyte and containment of the respective gases. In order to assemble said metal parts, it has been necessary to make use of various gaskets and sealing members. Thus, not only have the prior constructions been relatively expensive to fabricate and assemble, but said fuel cell structures have been particularly subject to corrosion, even though the metals used are of the normally corrosion resistant types and relatively expensive to provide originally.

It is, therefore, an object of my invention to proivde a fuel cell structure which may be formed substantially totally of ceramic material, with the exception of the electrodes thereof so as to virtually eliminate the corrosion problems encountered with the prior constructions. As a result, not only is the fuel cell structure of the present invention relatively inexpensive to originally provide and useful over a long period of life, said fuel cell structure, due to the inexpensiveness of the original materials, is of a type which may be discarded and replaced after its useful life has been served. Also, due to the inherent characteristics of ceramic materials, a fuel cell structure may be provided following the principles of the present invention which is highly efficient in use and adapts itself to an efficient fuel cell assembly not heretofore possible.

It is a further object of my invention to provide a fuel cell structure wherein the oxidizing and fuel gas channels may be formed of ceramic materials separated by a porous ceramic partition within which the liquid electrolyte may be contained, said ceramic structure being capable of formation using known ceramic processes. The ceramic gas channels may be sealed gas tight by conventional fired glazing and using conventional ceramic procedures, while the porous partition is merely originally molded in the porous state and maintained free from any sealing. Furthermore, a series of said ceramic fuel cell structures may be assembled with the various gas channels and porous partitions aligned, with the joints therebetween sealed with the conventional ceramic glazing, thereby providing an assembled ceramic fuel cell structure which is extremely economical to produce, yet will operate with maximum efficiency.

It is still another object of my invention to provide a fuel cell structure of the foregoing character wherein the oxidizing and fuel gas electrodes may be applied directly to opposite sides of said porous ceramic partition separating the oxidizing and fuel gas channels so that the additional expense of electrode supporting arrangements is unnecessary. By providing a series of spaced porous partiform a series of alternate oxidizing and fuel gas channels, tions enclosed by sealed ceramic walls, it is possible to form a series of alternate oxidizing and fuel gas channels, each separated by a porous partition and each including an electrode at opposite sides thereof on said porous partitions. A multistage fuel cell structure may thereby be provided of any desired size and any conventional electrical circuitry may be combined therewith for connecting the various individual cells electrically either in series or in parallel.

It is an additional object of my invention to provide a fuel cell structure of the foregoing character wherein, in view of the simple configuration of the various oxidizing and fuel gas channels, it is possible to assemble therein various forms of supplementary electrode materials without the necessity for complicated and expensive supporting structures. For instance, metal gauze of various types and dependent on the desired results may be merely positioned in the various gas channels with the combined result of connecting the spaced electrodes of a particular gas channel in parallel electrical circuitry and augmenting the overall operation of the fuel cell structure. Furthermore, in the same instance where the electrical circuitry of the gas channel electrodes is to be in series connection, a ceramic separator may be positioned in said gas channel midway between said electrodes, with the spaces between said separator and said electrodes being filled with metal gauze or metal grids.

It is also an object of my invention to provide a fuel cell assembly incorporating a series of fuel cell structures of the foregoing character, said assembly being of a unique nature and having efficient operating characteristics. With relatively slight alterations, said assembly may be provided for either parallel or counter oxidizing and fuel gas flow therethrough, providing said assembly with maximum versatility. The unique nature of said assembly permits the simple installation of the various preheaters and fuel vaporizers therein, all efficiently combined with the unique ceramic fuel cell structures for maximum efficiency of overall operation.

Other objects and advantages of the invention will be apparent from the following specification and the accompanying drawings which are for the purpose of illustration only, and in which:

FIG. 1 is a fragmentary, vertical, sectional view of a fuel cell assembly incorporating certain of the principles of the present invention and including fuel cell structures according to the present invention;

FIG. 2 is a horizontal, sectional view taken along the broken line 2—2 in FIG. 1;

FIG. 3 is an enlarged, horizontal, sectional view taken along the broken line 3—3 in FIG. 1 and illustrating one form of multiple fuel cell structure according to the principles of the present invention;

FIG. 4 is a fragmentary, horizontal, sectional view somewhat similar to FIG. 3, but illustrating a modified form of multiple fuel cell structure;

FIG. 5 is a view similar to FIG. 4 and illustrating a still further modified form of multiple fuel cell structure;

FIG. 6 is a fragmentary, perspective view illustrating one form of end construction for the multiple fuel cell structure of FIG. 3;

FIG. 7 is a fragmentary, perspective view of a still further form of multiple fuel cell structure and showing an end construction therefor;

FIG. 8, is a fragmentary, perspective view of a unitary, multiple fuel cell structure and showing the end construction therefor; and FIG. 9 is a view similar to FIG. 1 and showing a modified form of fuel cell assembly according to the principles of the present invention.

Referring to FIGS. 3 and 6 of the drawings, a multiple fuel cell structure incorporating certain of the principles of the present invention is generally indicated at 10 and includes a series of assembled generally U-shaped cross section ceramic members generally indicated at 12, each having transversely spaced and parallel sealed wall portions 14 integrally connected to and transversely spaced by porous partition portions 16. The ceramic members 12 are aligned with the sealed wall portions 14 thereof depending in the same transverse direction so that the porous partition portions 16 form alternating oxidizing gas channels 18 and fuel gas channels 20 therebetween, with the outermost of the oxidizing gas channels being closed by sealed sidewall members 22 and 24. All of the sealed wall portions 14 and sealed sidewall members 22 and 24 are fire glaze sealed so as to be free from permitting the escape of gases therethrough, and the porous partition portions 16 are formed to contain in the order of 30 to 70 percent free space.

During fabrication of the multiple fuel cell structure 10, to be hereinafter described more in detail, the various ceramic members 12 are conventionally cemented together to provide the overall structure and to position the porous partition portions 16 and the oxidizing and fuel gas channels 18 and 20, as shown. Furthermore, a metal oxidizing gas electrode 26 is secured to each of the porous partition portions 16 at the internal sides of the oxidizing gas channels 18 and a metal fuel gas electrode 28 is secured to each of the porous partition portions at the internal sides of each of the fuel gas channels 20. Each of the oxidizing and fuel gas electrodes 26 and 28 is generally plate-like so as to substantially cover the particular surface of the porous partition portions 16, with said electrodes being relatively thin in the order of 0.001 inch to 0.01 inch thickness, depending on the particular material and application.

The individual ceramic members 12 are formed of appropriate size and in the multiple fuel cell structure 10 may be of continuous longitudinal length or stacked and cemented longitudinal lengths, in either event, forming virtually longitudinally continuous porous partition portions 16, and oxidizing and fuel gas channels 18 and 20. As illustrated in FIG. 6, longitudinally spaced, upper and lower ends 30 of the multiple fuel cell structure 10 may be formed with the upper and lower ends of the oxidizing gas channels 18 open and the upper and lower ends of the fuel gas channels 20 closed by sealed end wall members 32 having fuel gas inlet and outlet tubes 34 communicating through said end wall members with the respective fuel gas channels 20. Electrical connectors 36 extend from the upper and lower ends of the various oxidizing and fuel ga electrodes 26 and 28 through the end wall members 32 and between the various ceramic members 12 for providing exterior electrical communication from the electrodes outward of the multiple fuel cell structure 10, and where the structure is formed of multiple end connected ceramic members, the various electrodes internally of said structure may likewise be appropriately electrically connected by similar electrical connectors.

In fabrication of the multiple fuel cell structure 10, the ceramic members 12, the sidewall members 22 and 24 and the end wall members 32 may be formed of any usual ceramic materials well known in the ceramic art, for instance, preferably sintered magnesium oxide with alternatives of beryllium or zirconium oxide, using usual ceramic molding techniques of pressing or casting and firing so as to be rigid and shape self-sustaining. The various ceramic components are squared and trued by grinding and then the various sealed portions and members are glazed and fired, using usual commercial high temperature porcelain glazes and firing in the usual manner. The fuel gas inlet and outlet tubes 34 may be of glaze sealed ceramic originally molded on the end wall members 32 or later inserted and sealed therein, or may be of metal later inserted and sealed therein.

The various oxidizing and fuel gas electrodes 26 and 28 are formed by flame coating the sides of the porous partition portions 16 with silver to produce the relatively thin electrode metal coating adhering directly to the partition portion surfaces and sintered in place. Other known methods for providing the oxidizing and fuel gas electrodes 26 and 28 may be used, such as flowing an alcoholic suspension of silver chloride or silver nitrate onto the electrode area and then reducing the same in a hydrogen furnace, with alternate electrode materials being nickel, platinum, palladium, silverized zinc oxide, lithiated nickel or others well known in the art.

After the individual ceramic members 12 have been formed and the oxidizing and fuel gas electrodes 26 and 28 applied, the porous partition portions 16 are saturated with a liquid electrolyte of any of the known compositions, such as a fused eutectic mixture of sodium carbonate, lithium carbonate and potassium carboante. Such saturation may be accomplished by emersing the porous partition portions 16 in the fused electrolyte in a vacuum chamber, after which, they are removed and cooled, being finally washed with water to remove surface carbonate so as to be ready for assembly into the multiple fuel cell structure 10. An alternate example of an appropriate electrolyte would be the hydroxides of sodium, lithium and potassium fused or as aqueous solutions, with the saturation being accomplished in the same manner.

The various ceramic members 12, sidewall members 22 and 24 and end wall members 32 are then ready for assembly in the manner shown, the various joints therebetween being appropriately cemented. Furthermore, the joints may be glaze painted and the multiple fuel cell structure 10 refired so as to provide virtually an integral structure having the oxidizing and fuel gas channels 18 and 20 sealed against the escape of gases therefrom. The multiple fuel cell structure 10 is then complete and ready for functioning in a fuel cell assembly to be hereinafter described.

Thus, the multiple fuel cell structure 10 incorporating certain of the principles of the present invention provides a series of fuel cells, each having a total ceramic supporting structure without the necessity of any metal supporting structures, nor gaskets nor seals which would be subject to corrosion. Actually, the only metal required in the overall multiple fuel cell structure 10 is that contained in the electrolyte and that forming the oxidizing fuel gas electrodes 26 and 28 with their electrical connectors 36. The structure 10 is, therefore, an extremely economical structure to fabricate and one having a long period of useful life, the economics being sufficient that the structure may be discarded after its useful life has been served, rather than any attempt being made to rehabilitate the same.

Various alternate forms of multiple fuel cell structures, according to the principles of the present invention, are illustrated in FIGS. 4, 5, 7 and 8. All of said alternate forms are fabricated generally in the same manner and from the same materials as that just described relative to the multiple fuel cell structure 10. The principal differences have to do with the particular configurations of the individual ceramic members, the installation of various materials and structures within the oxidizing fuel gas channels for restricting gas flow therethrough and the electrical connection of the various electrodes, that is electrically in series or parallel in order to produce the desired electrical energy.

Referring to FIG. 4, a multiple fuel cell structure is generally indicated at 38 formed by similar U-shaped cross section ceramic members 40. The only difference between the multiple fuel cell structure 38 and that previously described is that metal gauze 42 is inserted in fuel channels 44 in side contact with fuel gas electrodes 46 to short out said electrodes and thereby connect the same electrically in parallel. Oxidizing gas electrodes 48 at opposite sides of porous partition portions 50 are not shorted out so that oxidizing gas channels 52 remain open, although said oxidizing gas electrodes would require electrical connection in parallel in view of the parallel connection of the fuel gas electrodes 46.

The metal gauze 42 serves the dual purpose of connecting the fuel gas electrodes 46 in parallel and the retardation of fuel gas flow through the fuel gas channels 44. In this manner, the fuel gas flow may be regulated to provide a maximum of efficiency of operation of the multiple fuel cell structure 38.

The multiple fuel cell structure generally indicated at 54 and shown in FIG. 5 is also similar to that of FIGS. 3 and 6, with the addition of metal grids 56 in oxidizing gas channel 58 against oxidizing gas electrode 60, said metal grids in any given oxidizing gas channel being electrically separated by ceramic separators 62. Fuel gas channels 64 remain open and fuel gas electrodes 66 in said fuel gas channels and at the opposite sides of porous partition portions 68 remain unconnected. Thus, in view of the electrical separation of the oxidizing gas electrodes 60, despite the metal grids 56, by the ceramic separators 62, and the fact that the fuel gas electrodes 66 are not connected, it is possible to connect the various electrodes of the multiple fuel cell structure 54 in series electrical connection.

Referring to FIG. 7, a multiple fuel cell structure 70 is formed by a series of ceramic members 72 which are generally H-shaped in cross section forming sealed wall portions 74 and porous partition portions 76 surfaced with oxidizing gas electrodes 78 and fuel gas electrodes 80. Each individual ceramic member 72 is transversely separated in the structure 70 by a sealed divider 82 so that each ceramic member forms a single oxidizing gas channel 84 and fuel gas channel 86. End wall members 88 close off the upper and lower ends of the oxidizing and fuel gas channels 84 and 86, with appropriate oxidizing and fuel gas tubes 90 and 92 communicating through said end wall members with said channels, along with appropriate electrical connectors 94 to the oxidizing and fuel gas electrodes 78 and 80.

In the form in FIG. 8, a multiple fuel cell structure 96 is formed of a single or unitary ceramic member 98 appropriately divided by sealed wall portions 100 and porous partition portions 102 for alternate oxidizing and fuel gas channels 104 and 106. The opposite sides of the porous partition portions 102 are surfaced by oxidizing and fuel gas electrodes 108 and 110, with the upper and lower ends of the structure 96 being closed by sealed end wall members 112. Again, appropriate oxidizing and fuel gas tubes 114 communicate through the end wall members 112 into the oxidizing and fuel gas channels 102 and 104, with electrical connectors 116 also communicating through said end wall members with the oxidizing and fuel gas electrodes 108 and 110.

Referring to FIGS. 1 and 2, a fuel cell assembly is generally indicated at 118 for installation and operation of any one of the multiple fuel cell structures hereinbefore described. For purposes of illustration, consider that the multiple fuel cell structure 10 is operably installed in the fuel cell assembly 118, but with the electrical connectors 36 thereof extending from the lower of the end wall members 32.

As shown in FIG. 1, the fuel cell assembly 118 includes a sheet metal outer jacket 120 of hollow cylindrical configuration and inwardly lined with glass fiber insulation 122. A series of metal air ducts 124 are positioned inwardly of the insulation 122 communicating with the outer atmosphere at an upper flanged baffle 126, extending downwardly along the jacket 120 and opening into an inner fuel cell chamber 128 immediately above a fire brick floor 130. The flow of air through the air ducts 124 from the flanged baffle 126 into the fuel cell chamber 128 may be selectively regulated by adjustable butterfly-type valves 132.

The fuel cell chamber 128 is enclosed outwardly by a sheet metal shell 134 capable of withstanding at least 600° centigrade on a continuous basis. Between the chamber shell 134 and the air ducts 124, said assembly is lined with a conventional form of fire brick 136. The chamber shell 134 terminates upwardly in a sheet metal stack 138 which forms the inward side of the air ducts 124 at the upper part of the assembly, as shown.

The multiple fuel cell structure 10 is appropriately supported intermediate the height of the fuel cell chamber 128, with the fuel gas outlet tubes 34 merely opening downwardly into the lower part of said chamber. The electrical connectors 36 of the multiple fuel cell structure 10 also extend downwardly therefrom into and through the fuel cell chamber 128, being connected outwardly of the fuel cell assembly 118 to an appropriate electrical energy consuming member (not shown) in the usual manner. A typical preheat burner 140 is positioned in the lower part of the fuel cell chamber 128 spaced below the multiple fuel cell structure 10 and the lower or outlet fuel gas tubes 34, said burner being connected by a fuel line 142 to an available source of fuel outwardly of the assembly for a purpose to be hereinafter described.

The upper or inlet fuel gas tubes 34 of the multiple fuel cell structure 10 are connected to a fuel vaporizer 144 overlying said structure. The fuel vaporizer 144 is of typical construction, as shown in FIG. 2, and is upwardly connected with a fuel preheat coil 146 telescoped by the stack 138. A main fuel inlet line 148 is connected to an outside source of fuel and extends upwardly through the coil 146 to the upper end thereof, as shown.

The fuel cell assembly 118, as described, is designed for counterflow of the oxidizing and fuel gases through the multiple fuel cell structure 10, that is, the oxidizing gas in the form of air flowing upwardly through the multiple fuel cell structure and exhausting through the stack 138, with the fuel flowing into the fuel preheat coil 136, being vaporized in the fuel vaporizer 144 into gaseous form and flowing as fuel gas downwardly through the multiple fuel cell structure. Furthermore, the fuel cell structures and assemblies of the present invention are adapted for use with virtually any of the usual fuels, such as hydrogen, propane, natural gas, coal gas, water gas, alcohol, animal and vegetable oils, kerosene and diesel oil. Certain of the hydrocarbon fuels may produce carbon deposits in the fuel channels of the fuel cell structures and in such event, small amounts of water may be added to the fuel vaporizer 144 for resolving the problem and increasing efficiency.

In operation of the fuel cell assembly 118 of FIGS. 1 and 2 with the use of the multiple fuel cell structure 10 of FIG. 3, the available fuel is directed into the preheat burner 140 and burned until the multiple fuel cell structure 10 reaches operating temperature in the order of 500 to 900° centigrade, at which time the fuel is switched into the fuel preheat coil 146, is vaporized in the fuel vaporizer 144 and flows as fuel gas downwardly through the fuel gas channels 20 of the multiple fuel cell structure. The oxidizing gas in the form of air enters at the flanged baffle 126, is preheated in passage along the stack 138, flows downwardly to the air ducts 124 and enters the fuel cell chamber 128 at the lower extremity thereof as regulated by the valves 132. Said preheated air then flows upwardly through the oxidizing gas channels 18 of the multiple fuel cell structure 10.

The electrolyte originally having been installed in the porous partition portions 16 of the multiple fuel cell structure 10 functions in the usual manner through the ion exchange for producing the opposite electrical charges on the oxidizing and fuel gas electrodes 26 and 28, with the electrical energy produced being directed from said electrodes and from the fuel cell assembly 118 through the electrical connectors 36, either in parallel or in series, as desired. The hot exhaust products of the oxidizing gas flow upwardly from the top of the multiple fuel cell structure 10 through the open upper ends of the oxidizing gas channels 18 circulating around the fuel vaporizer 144 and the fuel preheat coil 146 in passage upwardly through the stack 138 to provide the heat for these various components. The exhaust products of the fuel gas flow from the multiple fuel cell structure 10 and the fuel gas channels 20 thereof through the fuel gas outlet tubes 34 and at said tubes are maintained ignited for burning off the remaining small amounts of fuel gas therein, the products of such burning mixing with the entering air for passage therewith upwardly through the oxidizing gas channels 18, serving an efficiency increasing function, as is well known in the art.

The fuel cell assembly 150 shown in FIG. 9 is in most respects virtually the same as that just described, with the exception that the flow of oxidizing and fuel gases through the multiple fuel cell structure 10 thereof is in parallel flow pattern. The fuel cell assembly 150, therefore, includes jacket 152 inwardly lined by insulation 154 and enclosnig air ducts 156 communicating from flanged baffle 158 to fuel cell chamber 160 at the bottom of said chamber and above ffoor 162, being regulated by valves 164. Chamber shell 166 is enclosed by a fire brick lining 168 between said shell and the air ducts 156, and in this case, is also partially inwardly lined by a firebrick lining 170 for a purpose to be hereinafter described.

The chamber shell 166 terminates upwardly in a stack 172 and generally encloses a fuel preheat coil 174, as well as forms the inner side of the air ducts 156 at the upper part of the assembly. A usual preheat burner 176 is positioned at the lower part of the fuel cell chamber 160 connected for supply of any available fuel in performing the preheating function, as hereinbefore described. The multiple fuel cell structure 10 is supported intermediate the fuel cell chamber 160, in this case, within the fire brick lining 170, as shown.

In order to provide the counterflow of the fuel gas into the multiple fuel cell structure 10, the lower end of the fuel preheat coil 174 is connected through a fuel duct 178 positioned within the inner fire brick lining 170, said duct extending downwardly and communicating into a fuel vaporizer 180 spaced below the lower extremities of the multiple fuel cell structure 10. The fuel vaporizer 180 is, in turn, connected to the fuel gas inlet tubes 34 of the multiple fuel cell structure 10 for passage of the vaporized fuel or fuel gas upwardly through the fuel gas channels 20 parallel to the flow of the air upwardly through the oxidizing gas channels 18. The upper ends of the fuel gas channels 20 are connected through the fuel gas outlet tubes 34 to an exhaust header 182 which is, in turn, connected through an exhaust duct 184 within the inner fire brick lining 170 to an afterburner 186 spaced below the multiple fuel cell structure 10.

The overall operation of the fuel cell assembly 150 is in most respects the same as that described relative to the fuel cell assembly 118 of FIGS. 1 and 2, with the exception of the before-mentioned parallel fuel and oxidizing gas flow through the multiple fuel cell structure 10. In view of the fuel gas flowing upwardly through the multiple fuel cell structure 10, the fuel duct 178 is required for positoning the fuel vaporizer 180 beneath said structure, and the exhaust header, duct and afterburner 182, 184 and 186 are required for burning off the excess fuel gases beneath said structure to mix with the entering air. In both the presently described fuel cell assembly 150, as well as the previously described fuel cell assembly 118, various appropriate pumps, blowers and valves may be conventionally used, as required, and also, any of the various multiple fuel cell structures may be used to obtain the particular results desired.

Thus, I have provided, according to the principles of the present invention, a basic fuel cell structure, which obviously may be singular or multiple, wherein virtually the entire fuel cell structure is formed of ceramic materials, the only metal being required is that for the particular oxidizing and fuel gas electrodes, as well as the electrical connectors therefor. As a result, I have provided an extremely economical electrode supporting and gas channel forming ceramic structure which will perform efficiently, yet does not require any corrosion prone metal or seals which have been extremely troublesome and expensive in the prior constructions. Furthermore, I have provided various embodiments of a unique fuel cell assembly incorporating any of the multiple fuel cell structures of the present invention, said fuel cell assembly being easily adaptable to either parallel or counter gas flow, being relatively economical to fabricate and being efficient in operation.

It should be kept in mind that by the illustration and description herein of fuel cell structures of specific configurations, it is not intended to limit the broader concept of ceramic fuel cell structures to such configurations alone. It is obvious that many other forms of fuel cell structures may be designed of various other sizes and shapes without departing from the broader principles of the present invention and as conditions dictate, for instance, cylindrical disc shapes, rather than the somewhat rectangular shapes shown, as well as many other geometrical configurations.

I claim:

1. In a fuel cell assembly, the combination of: fuel cell means for the production of electricity including at least one fuel cell; said fuel cell including a porous, electrolyte impregnated, ceramic partition, said porous ceramic partition being rigid and shape self-sustaining prior to and after said electrolyte impregnation with said electrolyte impregnating said porosity thereof, originally porous ceramic walls of substaitially the same material as said porous ceramic partition operably connected to said ceramic partition forming a fuel gas channel at one side of said ceramic partition and an oxidizing gas channel at the other side of said ceramic partition, said originally porous ceramic walls being sealed with fire glazed coatings against gas passage therethrough from said gas channels, a fuel electrode in said fuel gas channel and an oxidizer electrode in said oxidizing gas channel, both said electrodes surface contacting said porous, electrolyte impregnated, ceramic partition with said partition remaining porous between said gas channels except for said electrode surface contact and said electrolyte impregnation; a tubular enclosure enveloping said fuel cell means; fuel directing means for introducing a fuel medium into said enclosure and fuel gas into said fuel gas channel of said fuel cell; oxidizer directing means for introducing an oxidizing medium into said enclosure and oxidizer gas into said oxidizing gas channel of said fuel cell; exhaust means for exhausting said fuel and oxidizing gas channels, said exhaust means directing exhaust gases from said enclosure; and electrical transmission means operably connected to said fuel and oxidizer electrodes for directing electricity from said fuel cell means and from said enclosure.

2. In a fuel cell, the combination of originally porous ceramic walls forming a fuel gas channel and an oxidizing gas channel; a porous ceramic partition operably connected to said ceramic walls between and separating said gas channels, said partition being impregnated with an electrolyte, said porous ceramic partition being rigid and shape self-sustaining prior to and after said electrolyte impregnation with said electrolyte impregnating said porosity thereof; said porous ceramic walls originally being of substantially the same porous ceramic material as said porous ceramic partition; fire glazed coatings sealing said originally porous ceramic walls against the passage of gases therethrough from said gas channels; an electrode in each of said gas channels surface contacting opposite sides of said porous, electrolyte impregnated, ceramic partition with said partition remaining porous between said gas channels except for said electrode surface contact and said electrolyte impregnation; fuel directing means for introducing fuel gas into said fuel gas channel; oxidizer directing means for introducing oxidizing gas into said oxidizing gas channel; means for exhausting gases from said gas channels; and electrical transmission means operably connected to said electrodes for the transmission of electricity from said channels.

3. A fuel cell as defined in claim 2 in which certain of said ceramic walls are formed by integral leg parts of a U-shaped cross section originally porous ceramic member and said ceramic partition is formed by an integral leg connecting part of said ceramic member, said leg connecting part remaining porous and said leg parts being originally porous and sealed by said fire glazed coatings.

4. A fuel cell as defined in claim 2 in which certain of said ceramic walls are formed by integral leg parts of an H-shaped cross section originally porous ceramic member and said ceramic partition is formed by an integral leg connecting part of said ceramic member, said ceramic member leg parts partially defining said fuel gas and oxidizing gas channels at opposite sides of said ceramic member connecting part, said leg connecting part remaining porous and said leg parts being originally porous and sealed by said fire glazed coatings.

5. A fuel cell as defined in claim 2 in which certain of said ceramic walls are formed by integral leg parts of one of a U-shaped cross section and H-shaped cross section originally porous ceramic member, an integral leg connecting part of said ceramic member forming said ceramic partition, said leg connecting part remaining porous and said leg parts being originally porous and sealed by said fire glazed coatings; and in which said electrodes are formed as metal coatings at said opposite sides of said porous, electrolyte impregnated ceramic partition.

6. A fuel cell as defined in claim 2 in which certain of said sealed ceramic walls are formed by integral fire glazed coated leg parts of a plurality of stacked U-shaped cross section originally porous ceramic members, integral leg connecting parts of said ceramic members remaining porous and forming a plurality of said porous, electrolyte impregnated, ceramic partitions, said porous ceramic partitions each being rigid and shape self-sustaining prior to and after said electrolyte impregnation with said electrolyte impregnating said porosity thereof, said ceramic members defining a plurality of alternate fuel gas and oxidizing gas channels separated by said porous ceramic partitions; in which there are electrodes in each of said gas channels surface contacting opposite sides of said porous, electrolyte impregnated, ceramic partitions; in which said fuel and oxidizer directing means introduce fuel and oxidizing gas into all of said fuel and oxidizing gas channels; and in which said means for exhausting gases from said gas channels exhausts gas from all of said gas channels.

7. A fuel cell as defined in claim 2 in which certain of said ceramic walls are formed by integral fire glazed coated leg parts of a plurality of stacked H-shaped cross section originally porous ceramic members, integral leg connecting parts of said ceramic members remaining porous and forming said porous, electrolyte impregnated ceramic partitions, said porous ceramic partitions each being rigid and shape self-sustaining prior to and after said electrolyte impregnation with said electrolyte impregnating said porosity thereof, said ceramic members defining a plurality of alternate fuel gas and oxidizing gas channels with said porous ceramic partitions separating said gas channels; in which there are electrodes in each of said gas channels surface contacting opposite sides of said porous, electrolyte impregnated, ceramic partitions; in which said fuel and oxidizer directing means introduce fuel and oxidizing gas into all of said fuel gas and oxidizing gas channels; and in which said means for exhausting gases from said gas channels exhausts gases from all of said gas channels.

8. A fuel cell as defined in claim 2 in which said fuel gas channel is a first fuel gas channel and said originally porous and fire glazed sealed ceramic walls form a second fuel gas channel at an opposite side of said oxidizing gas channel from said first fuel gas channel; in which there are two porous, electrolyte impregnated, ceramic partitions at opposite sides of said oxidizing gas channel remaining porous and separating said oxidizing gas channel from said fuel gas channels, said porous ceramic partitions each being rigid and shape self-sustaining prior to and after said electrolyte impregnation with said electrolyte impregnating said porosity thereof, in which there are electrodes in each of said gas channels surface contacting opposite sides of each of said porous, electrolyte impregnated, ceramic partitions; in which there is an electrically insulating ceramic partition intermedate said oxidizing gas channel spaced between said porous ceramic partitions; and in which there are conducting contact metal grids in said oxidizing gas channel at opopsite sides of said insulating ceramic partition between said insulating ceramic partition and said porous ceramic partitions, said conducting contact grids contacting siad electrodes of said oxidizing gas channel within said channel.

References Cited

UNITED STATES PATENTS

| | | | |
|---|---|---|---|
| 2,980,749 | 4/1961 | Broers | 136—86 |
| 3,146,131 | 8/1964 | Linden et al. | 136—86 |
| 3,150,657 | 9/1964 | Schultz et al. | 136—86 X |
| 3,288,646 | 11/1966 | Soredal | 136—86 |
| 3,300,344 | 1/1967 | Bray et al. | 136—86 |
| 3,321,333 | 5/1967 | Palmer | 136—86 |
| 3,367,801 | 2/1968 | Kreiselmaier | 136—86 |
| 3,382,105 | 5/1968 | McBryar et al. | 136—86 |

OTHER REFERENCES

Fuel Cell Systems, American Chemical Society, 1965, Baker et al., High Temperature Natural Gas Cells, pp. 253–258.

ALLEN B. CURTIS, Primary Examiner